US006895532B2

(12) United States Patent
Raynham

(10) Patent No.: US 6,895,532 B2
(45) Date of Patent: May 17, 2005

(54) WIRELESS SERVER DIAGNOSTIC SYSTEM AND METHOD

(75) Inventor: Michael B. Raynham, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 631 days.

(21) Appl. No.: 09/848,574

(22) Filed: May 3, 2001

(65) Prior Publication Data
US 2002/0166084 A1 Nov. 7, 2002

(51) Int. Cl.[7] ................................................. G06F 11/32
(52) U.S. Cl. .......................................... 714/46; 714/25
(58) Field of Search .............................. 714/25, 37, 46, 714/48; 709/224; 370/912, 913

(56) References Cited

U.S. PATENT DOCUMENTS

| | | | | |
|---|---|---|---|---|
| 6,227,043 B1 * | 5/2001 | Schoenbeck et al. | .......... | 73/116 |
| 6,317,639 B1 * | 11/2001 | Hansen | .......... | 700/83 |
| 6,349,335 B1 * | 2/2002 | Jenney | .......... | 709/224 |
| 6,448,958 B1 * | 9/2002 | Muta | .......... | 345/169 |
| 6,567,381 B1 * | 5/2003 | Jeon et al. | .......... | 370/252 |
| 6,618,823 B1 * | 9/2003 | West | .......... | 714/25 |
| 6,621,413 B1 * | 9/2003 | Roman et al. | .......... | 340/539.12 |
| 6,651,190 B1 * | 11/2003 | Worley et al. | .......... | 714/43 |
| 6,662,318 B1 * | 12/2003 | Baysah et al. | .......... | 714/48 |
| 6,664,987 B1 * | 12/2003 | Tarbox et al. | .......... | 345/853 |
| 6,690,403 B1 * | 2/2004 | Tuli | .......... | 345/854 |
| 6,701,521 B1 * | 3/2004 | McLlroy et al. | .......... | 717/173 |
| 6,757,521 B1 * | 6/2004 | Ying | .......... | 455/67.11 |
| 6,829,720 B2 * | 12/2004 | Schoenthal et al. | .......... | 714/4 |
| 6,834,299 B1 * | 12/2004 | Hamilton et al. | .......... | 709/220 |
| 2002/0056114 A1 * | 5/2002 | Fillebrown et al. | .......... | 725/78 |
| 2002/0068983 A1 * | 6/2002 | Sexton | .......... | 700/2 |
| 2002/0095427 A1 * | 7/2002 | Kaplan | .......... | 707/102 |
| 2002/0115445 A1 * | 8/2002 | Myllymaki | .......... | 455/456 |
| 2003/0140107 A1 * | 7/2003 | Rezvani et al. | .......... | 709/208 |

* cited by examiner

Primary Examiner—Scott Baderman
Assistant Examiner—Anne L. Damiano
(74) Attorney, Agent, or Firm—David M. Mason

(57) ABSTRACT

A wireless diagnostic system for diagnosing a problem with at least one server includes a portable diagnostic tool. The portable diagnostic tool includes a wireless transmitter and a wireless receiver. The portable diagnostic tool is configured to transmit requests with the tool's wireless transmitter. A wireless communication subsystem is coupled to a first server. The wireless communication subsystem includes a wireless transmitter and a wireless receiver. The wireless communication subsystem is configured to receive a transmitted request from the portable diagnostic tool with the subsystem's wireless receiver. The wireless communication subsystem is configured to transmit service information with the subsystem's wireless transmitter in response to a received request. The portable diagnostic tool is configured to receive the service information with the tool's wireless receiver.

12 Claims, 2 Drawing Sheets

WIRELESS SERVER DIAGNOSTIC SYSTEM AND METHOD

THE FIELD OF THE INVENTION

The present invention relates to diagnostic techniques for computer servers systems. More particularly, the invention relates to a wireless system and method for diagnosing computer server systems.

BACKGROUND OF THE INVENTION

Currently, there are a number of techniques for diagnosing problems with server systems. A first step that is taken in diagnosing a server problem is identification of the server or servers that are experiencing a problem. This may be a complex task for very large server farms including a large number of servers. A server is typically identified by placing a stick-on label on the server, which includes a server name or other identifying information. Alternatively, servers may be provided with an LCD screen or other display for displaying server identification information. For high-density server systems, these techniques are problematic for a couple of reasons. First, with stick-on labels, a user must visually inspect the servers and manually identify a server of interest, which can be a time-consuming process when a large number of servers must be inspected. Second, a frontal surface on a server for placing an LCD display is seldom available.

After identifying a particular server, the problem with the server must be diagnosed. Some servers have LCD displays for displaying diagnostic messages. Such diagnostic display subsystems can be costly, and as mentioned above, frontal surface area on a server is seldom available for such as display. And the visibility can be marginal when a server is installed in the top of an extended rack with a large number of servers. Further, the displayed information is often limited to "cryptic" text messages, usually only in the English language, due to the internal message string storage limitations, and the complexities of translation into 7 or more languages to cover worldwide needs. Such LCD displays typically display error codes that must be manually looked up in a reference manual by a maintenance person. Displayed component error codes are usually specific to particular server models, and require manual look up in a service manual for the particular server model. A picture is often needed to find the faulty component or subassembly in the server.

Other less expensive approaches have been used, such as using LED's on internal printed circuit assemblies, with very poor to no visibility. LED's have also been provided on an internal or external central panel with an appropriate plastic overlay including function names. Such display systems are costly, when costs for cables, connectors, interface chips, and printed circuit board area, are taken into account. In addition, the cables and connectors can contribute to system failure.

Server problems may also be diagnosed remotely. A first type of remote diagnostic connection is an "in-band" diagnostic connection. In-band remote diagnostic schemes typically require the server and the network to be working for server diagnoses to occur. In contrast, a second type of remote diagnostic scheme is an "out-of-band" connection, which allows diagnoses to be performed even when the server or network is non-functional. Out-of-band remote diagnostic connections have previously been implemented with a phone line and an external bus. The cabling and connectors used in such out-of-band schemes increase system costs, and can contribute to system failures. Further, the large number of cables needed for high-density server systems can make this cable-based approach problematic.

It would be desirable to provide a server diagnostic system and method based on wireless technology without many of the disadvantages found in conventional diagnostic systems and methods.

SUMMARY OF THE INVENTION

One form of the present invention provides a wireless diagnostic system for diagnosing a problem with at least one server. The system includes a portable diagnostic tool. The portable diagnostic tool includes a wireless transmitter and a wireless receiver. The portable diagnostic tool is configured to transmit requests with the tool's wireless transmitter. A wireless communication subsystem is coupled to a first server. The wireless communication subsystem includes a wireless transmitter and a wireless receiver. The wireless communication subsystem is configured to receive a transmitted request from the portable diagnostic tool with the subsystem's wireless receiver. The wireless communication subsystem is configured to transmit service information with the subsystem's wireless transmitter in response to a received request. The portable diagnostic tool is configured to receive the service information with the tool's wireless receiver.

Another form of the present invention provides a method of identifying a problem with at least one server. A request is wirelessly transmitted with a portable diagnostic tool. A wireless communication subsystem coupled to a first server is provided. The transmitted request from the portable diagnostic tool is received with the wireless communication subsystem. Service information is wirelessly transmitted with the wireless communication subsystem in response to a received request. The service information is received with the portable diagnostic tool.

Another form of the present invention provides a portable server diagnostic tool. The tool includes a wireless transmitter for wirelessly transmitting a request to a first plurality of servers. A wireless receiver wirelessly receives service information from at least one server in the first plurality of servers. A display screen displays diagnostic information based at least in part on the received service information.

Another form of the present invention provides a server, including a processor, and a memory coupled to the processor. A controller coupled to the processor is configured to monitor activities of the processor and store server status information. A wireless communications subsystem coupled to the controller is configured to wirelessly transmit at least a subset of the server status information.

DESCRIPTION OF THE PREFERRED EMBODIMENTS

In the following detailed description of the preferred embodiments, reference is made to the accompanying drawings that form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
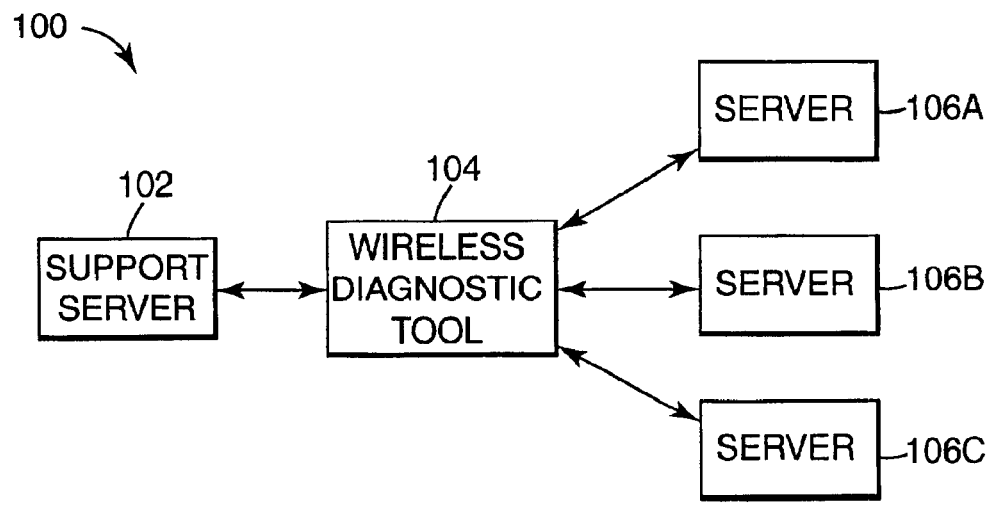
FIG. 1 is a block diagram of a wireless diagnostic system for a server according to one embodiment of the present invention.

FIG. 1 is a block diagram of a wireless diagnostic system for a server according to one embodiment of the present invention. Wireless diagnostic system 100 includes support server 102, wireless diagnostic tool 104, and servers 106A–106C (collectively referred to as servers 106). Wireless diagnostic tool 104 is used to diagnose problems experienced by servers 106. Wireless diagnostic tool 104 communicates with servers 106 via a wireless communications link. In one embodiment, support server 102 provides service support information to wireless diagnostic tool 104 to aid in diagnosing servers 106. In one form of the invention, wireless diagnostic tool 104 communicates with support server 102 via a wireless communications link. In one embodiment, wireless diagnostic tool 104 uses standard wireless communication protocols and frequencies, although custom protocols could alternatively be used.

Figure 2:
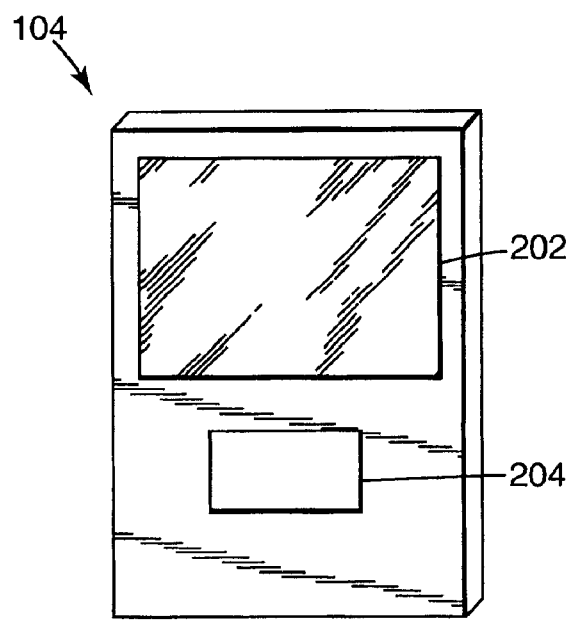
FIG. 2 is a perspective view of a wireless diagnostic tool according to one embodiment of the present invention.

FIG. 2 is a perspective view of a wireless diagnostic tool according to one embodiment of the present invention. Wireless diagnostic tool 104 includes display 202 and input device 204. In one embodiment, wireless diagnostic tool 104 is about the size of a credit card. In alternative embodiments, wireless diagnostic tool 104 may be any type of portable device with wireless capabilities, including, but not limited to, a portable computer, a cellular telephone, a personal digital assistant (PDA), or other portable device. In one form of the invention, display 202 is an LCD display, although other types of displays may be used. In one embodiment, input device 204 is a pressure-sensitive panel for entering character or key information, such as with a stylus. In alternative embodiments, other types of input devices 204 may be used, including conventional keyboard keys, and/or a screen pointing device such as a mouse, trackball, or optical pointing device.

In one form of the invention, wireless diagnostic tool 104 is attachable to an external surface of one of servers 106, which allows wireless diagnostic tool 104 to act as a "smart label," without the mechanical limitations of cabled diagnostic display subsystems. Also, since no cables are used, wireless diagnostic tool 104 may be hinged to one of servers 106, or some other mechanical attachment may be used (e.g., slidable attachment). Thus, even when attached to one of servers 106, wireless diagnostic tool 104 can be moved as needed to improve visibility or to reduce airflow blockage when not being viewed. Wireless diagnostic tool 104 can also be snapped into place within a rectangular cavity in a front surface of the case of one of servers 106. In one embodiment, a separate diagnostic tool 104 is attached to each one of the servers 106. In another form of the invention, wireless diagnostic tool 104 is packaged in the form of a standard insertable card (e.g., PCMCIA card) for a portable computer, personal digital assistant, or other portable device. When implemented as an insertable card, any of the functionality of WDT 104 described herein may be provided by the portable device carrying the insertable card. For example, portable computers, personal digital assistant devices, and other portable devices, typically have input and display devices, and some have IR or other communication subsystems, which may be used to provide features of wireless diagnostic tool 104.

Figure 3:
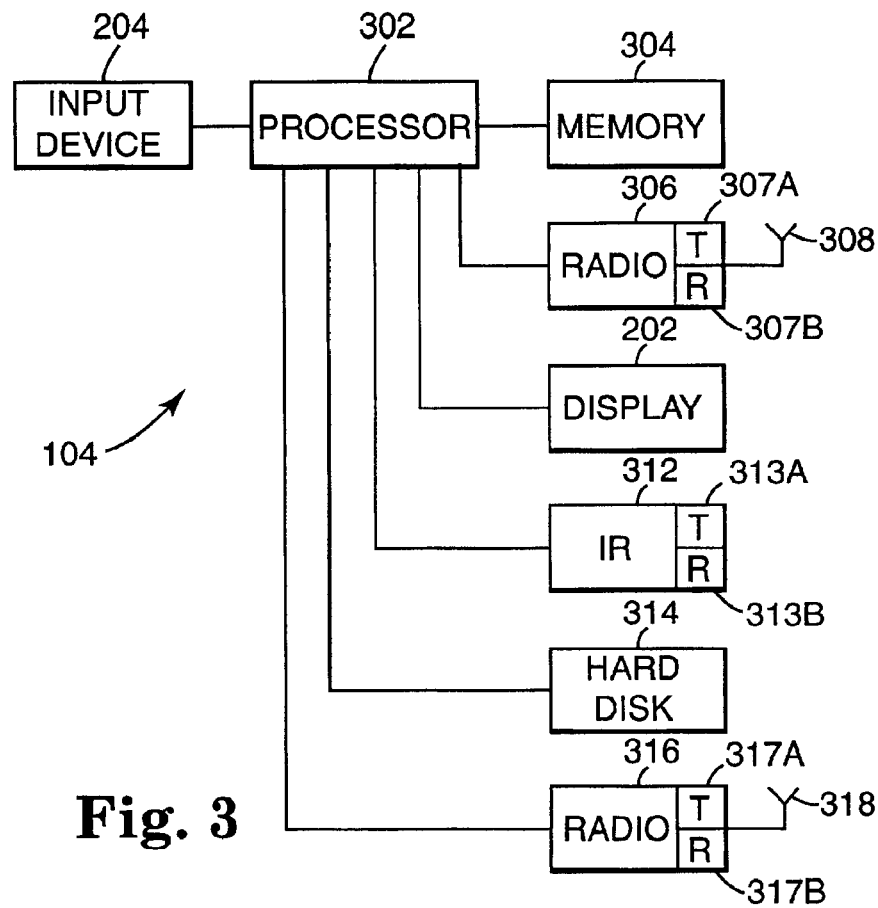
FIG. 3 is an electrical block diagram of major components of a wireless diagnostic tool according to one embodiment of the present invention.

FIG. 3 is an electrical block diagram of major components of a wireless diagnostic tool according to one embodiment of the present invention. Wireless diagnostic tool 104 includes input device 204, processor 302, memory 304, radio subsystems 306 and 316, antennas 308 and 318, display 202, infrared (IR) subsystem 312, and hard disk 314. Radio subsystem 306 includes transmitter 307A and receiver 307B. IR subsystem 312 includes transmitter 313A and receiver 313B. Radio subsystem 316 includes transmitter 317A and receiver 317B.

Processor 302 receives input information from a user via input device 204, and causes information to be displayed on display 202. Processor 302 accesses executable instructions and other information from memory 304 and hard disk 314. In one embodiment, memory 304 includes both volatile and non-volatile storage, such as RAM, ROM, EPROM, flash memory or other memory technology. Non-volatile storage is also provided by hard disk 314. In an alternative embodiment, other types of non-volatile storage may be provided, such as CD-ROM, DVD, or other optical storage, magnetic cassettes, magnetic tape, magnetic disk storage or other magnetic storage devices, or any other medium that can be used to store the desired information and that can be accessed by processor 302.

Processor 302 controls radio subsystems 306 and 316, and IR subsystem 312, to wirelessly communicate with support server 102 and servers 106. In one embodiment, radio subsystem 306 uses a standard communications protocol such as "Bluetooth" to transmit and receive short-range radio frequency communications via antenna 308. In one embodiment, radio subsystem 306 has a range of about 100 meters, and a speed of 100 kilobits/second at maximum power. In one form of the invention, wireless diagnostic tool 104 communicates with servers 106 using radio subsystem 306 and antenna 308. Alternatively or additionally, wireless diagnostic tool 104 communicates with servers 106 using IR subsystem 312, which transmits and receives infrared communications using a standard IR communications protocol. Although two short-range wireless subsystems 306 and 312 are shown in FIG. 3, alternative embodiments of wireless diagnostic tool 104 use only a single wireless subsystem.

In one embodiment, radio subsystem 316 uses a standard long-range wireless communications protocol, such as a cellular telephone communications protocol, to transmit and receive long-range radio frequency communications via antenna 318. In one form of the invention, wireless diagnostic tool 104 communicates with support server 102 using radio subsystem 316 and antenna 318.

Figure 4:
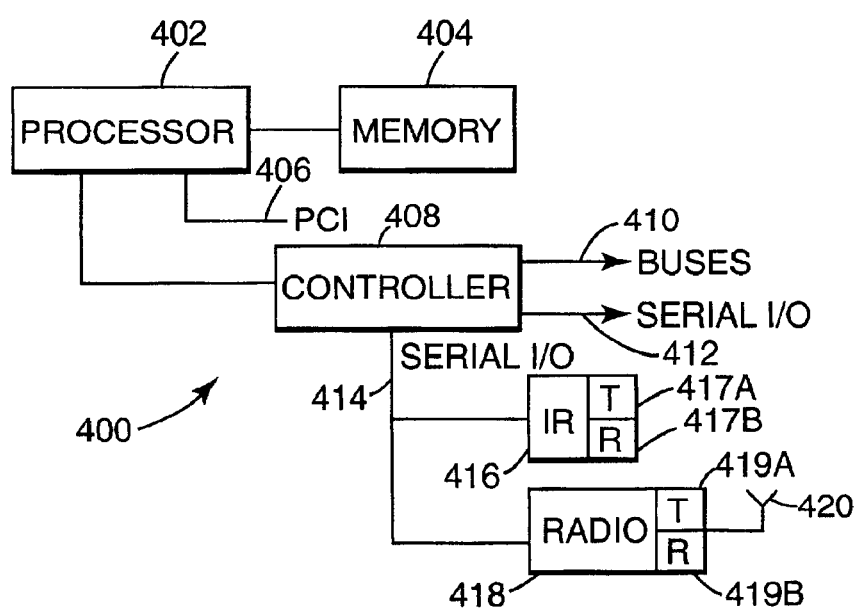
FIG. 4 is an electrical block diagram of major components of a server according to one embodiment of the present invention.

FIG. 4 is an electrical block diagram of major components of a server according to one embodiment of the present invention. In one embodiment, the server components illustrated in FIG. 4 are representative of major components contained in support server 102 and servers 106. Server 400 includes processor 402, memory 404, PCI bus 406, controller 408, buses 410, serial input/output links 412 and 414, IR subsystem 416, radio subsystem 418, and antenna 420. IR subsystem 416 includes transmitter 417A and receiver 417B. Radio subsystem 418 includes transmitter 419A and receiver 419B.

Processor 402 accesses executable instructions and other information from memory 404. PCI bus 406 provides a high-speed communications link that allows processor 402 to communicate with other devices, such as a hard disk drive, or a network, such as a local area network.

Processor 402 is coupled to controller 408. In one embodiment, controller 408 is a main server management controller. In one form of the invention, main server management controller 408 is powered by a standby power supply (not shown), so controller 408 is always active, even when server 400 is turned off. Main server management controller 408 monitors, reports, and logs activities of server 400. Controller 408 is coupled to buses 410, which are serial management buses in one embodiment. Controller 408 obtains server data, such as environmental status, error logs, and other server data, via serial management buses 410. Controller 408 communicates serially with other devices via serial input/output link 412. Controller 408 communicates serially with wireless communication subsystems 416 and 418 via serial input/output link 414.

In one embodiment, wireless diagnostic tool 104 communicates with the main server management controller 408, rather than with the server processor 402, thereby allowing service data to be obtained even when server 400 is powered-down or nonfunctional. Thus, wireless diagnostic tool 104 provides an out-of-band diagnostic connection to a server that does not rely on the server or network being functional. When implemented in one of servers 106, controller 408 controls wireless subsystems 416 and 418 to wirelessly communicate with wireless diagnostic tool 104. In one embodiment, radio subsystem 418 uses a standard communications protocol such as "Bluetooth" to transmit and receive short-range radio frequency communications via antenna 420. Radio subsystem 418 uses the same communications protocol as radio subsystem 306 in wireless diagnostic tool 104 for compatible wireless communication between the two subsystems 418 and 306. Alternatively or additionally, server 400 communicates with wireless diagnostic tool 104 using IR subsystem 416, which transmits and receives infrared communications using a standard IR communications protocol. IR subsystem 416 uses the same communications protocol as IR subsystem 312 in wireless diagnostic tool 104 for compatible wireless communication between the two subsystems 416 and 312. Although two short-range wireless subsystems 416 and 418 are shown in FIG. 4, alternative embodiments of server 400 use only a single wireless subsystem.

In one form of the invention, when implemented in support server 102, radio subsystem 418 uses a standard long-range wireless communications protocol, such as a cellular telephone communications protocol, to transmit and receive long-range radio frequency communications via antenna 420. When implemented in support server 102, radio subsystem 418 uses the same communications protocol as radio subsystem 316 in wireless diagnostic tool 104 for compatible wireless communication between the two subsystems 418 and 316.

As mentioned above in the Background of the Invention section, a first step that is taken in diagnosing a server problem is identification of the server or servers that are experiencing a problem. Wireless diagnostic tool 104 assists a user in quickly finding a server 106 in an installation having hundreds or thousands of servers, even if the server or network is non-functional. In one embodiment, wireless diagnostic tool 104 wirelessly broadcasts a request for an identification (ID) response via one of wireless subsystems 306 or 312. In one form of the invention, the request for an ID response includes a server identifier that uniquely identifies a particular one of the servers 106. Each server 106 stores server identification information in memory 404 or controller 408, which uniquely identifies the server. Servers 106 receive the request for an ID response from wireless diagnostic tool 104 via one of wireless subsystems 416 or 418. Controller 408 in each server 106 compares the received server identifier with the stored server identification information, and provides an ID response if the comparison results in a match. In one embodiment, the ID response is an audible signal such as the ringing of a buzzer. In an alternative embodiment, the ID response takes another form, such as flashing of a front panel LED, or other indication. Rather than including a particular server identifier in the request for an ID response, wireless diagnostic tool 104 could wirelessly broadcast a request to all servers 106, and servers 106 would be configured to provide a response only if they are experiencing problems. In one embodiment, servers 106 do not transmit wireless data unless requested by wireless diagnostic tool 104.

In one form of the invention, after a desired one of the servers 106 has been located, wireless diagnostic tool 104 assists a user in diagnosing and fixing the server. Wireless diagnostic tool 104 provides a diagnostic messaging capability that identifies server components that have failed. In one embodiment, wireless diagnostic tool 104 transmits a request for service data via one of wireless subsystems 306 or 312. In one form of the invention, the request for service data includes a server identifier that uniquely identifies the particular server 106 to be diagnosed and repaired. Servers 106 receive the request for service data from wireless diagnostic tool 104 via one of wireless subsystems 416 and 418. Controller 408 in each server 106 compares the server identifier with stored server identification information, and outputs service data via one of wireless subsystems 416 or 418 if the comparison results in a match. Wireless diagnostic tool 104 receives the service data via one of wireless subsystems 306 or 312.

In one embodiment, the service data output by servers 106 includes error information representing errors experienced by the server, server model number, options/accessories that are installed in the server and the suppliers of the options/accessories, server name, company name, server inventory ID number, software revision status, temperature and voltage measurements, service history information, and other system status information. In one form of the invention, the error information includes system error codes, such as "IO ERROR 56", or error codes specific to a failed component, such as "DIMM 3 hard error."

In one embodiment, wireless diagnostic tool 104 stores diagnostic and repair information in memory 304 or on hard disk drive 314, including animations, maps and other drawings of servers 106, repair instructions, error code decoding information, sound files containing voice-based descriptions of repair techniques, and other diagnostic and repair information, in multiple languages. If not currently stored in memory 304 or hard disk drive 314, this information or any subset thereof can be downloaded from support server 102 or from one of servers 106.

Processor 302 in wireless diagnostic tool 104 decodes received error codes and displays diagnostic and service advisory information on display 202. In one embodiment, wireless diagnostic tool 104 acts as a "service advisor", providing a recommended course of action based on error symptoms, system status information, and statistical data from previous server service repairs. In one form of the invention, the service advisory information includes notification of component alerts for components from certain suppliers, software/hardware revision compatibility issues, and information regarding environmental problems with fans, power supplies, and other components.

In one embodiment, processor 302 in wireless diagnostic tool 104 translates system error codes into an understandable local language text, which may be displayed as bit map images on display 202. Stroke character sets (e.g., Chinese characters) can be transmitted as bit map images, and Japanese characters can be sent as a full character set rather than the simplified characters typically used for built-in server LCD displays because of display controller cost and complexities.

In one form of the invention, processor 302 in wireless diagnostic tool 104 translates component error codes, and displays on display 202 pictures or animations of an assembly with the failed component, and one or more techniques for accessing the assembly and failed component inside the server. For example, the images can illustrate opening of the server cabinet, removal of a card that contains a failed component, and removal of the failed component. In one embodiment, processor 302 plays voice files in a local language in conjunction with the display of the images on display 202 to describe what to do to fix the server.

In one embodiment, wireless diagnostic tool 104 downloads diagnostic and repair information from support server 102 via a wireless communication link, such as between wireless subsystem 316 in tool 104 and wireless subsystem 418 in support server 102. Alternatively, a wired connection, such as a standard telephone connection, can be used for communications between support server 102 and wireless diagnostic tool 104. Diagnostic and repair information may be downloaded from support server 102 by wireless diagnostic tool 104 at the service site, or prior to visiting the service site. In addition, in one form of the invention, wireless diagnostic tool 104 wirelessly transmits service information to support server 102. In one embodiment, such service information includes information regarding the particular server or servers that were repaired, and the specific repairs that were performed. Thus, support server 102 acts as source of diagnostic and repair information for wireless diagnostic tool 104, and also as a central repository of service information provided by one or more of wireless diagnostic tools 104.

Embodiments of the present invention eliminate the cables and connectors (and the associated costs and failure problems) found in conventional diagnostic systems. The lower cost of embodiments of the present invention allow diagnostic capabilities to be provided on low cost servers, as well as high end server systems. Further cost savings are provided in embodiments of the present invention by using standard hardware, software, and communication protocols. Embodiments of the present invention provide an out-of-band diagnostic connection that does not rely on the server or network being functional. Embodiments of the present invention provide a technique for quickly locating a server of interest, in contrast to the slow manual process of conventional diagnostic techniques. Embodiments of the present invention allow more detailed diagnostic and repair information to be automatically displayed, as opposed to the limited cryptic messages found in conventional LCD server display subsystems and the need for manual look up of information. Embodiments of the present invention display complete diagnostic and repair information in any of multiple languages.

Although embodiments of the present invention are described in the context of a server, the techniques described herein are also applicable to other devices, such as printers, personal computers, and other consumer products. Embodiments of the present invention allow a single tool to be used to service all company products in the same manner, rather than using a unique solution for each product.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A portable server diagnostic tool comprising:
   a wireless transmitter for wirelessly transmitting a request to a first plurality of servers;
   a wireless receiver for wirelessly receiving service information that is wirelessly transmitted by at least one server in the first plurality of servers, wherein the service information includes system status information for the at least one server; and
   a display screen for displaying diagnostic information based at least in part on the received service information,
   wherein the displayed information includes at least one image of a portion of the at least one server.

2. The portable server diagnostic tool of claim 1, wherein the tool is configured to wirelessly communicate with a support server to obtain service support information from the support server.

3. The portable server diagnostic tool of claim 1, wherein the tool is configured to wirelessly communicate with a support server to transmit repair information to the support server.

4. The portable server diagnostic tool of claim 1, wherein the displayed diagnostic information includes error information representing at least one error experienced by the at least one server.

5. The portable server diagnostic tool of claim 1, wherein the tool is configured to display repair suggestion information on the display screen based at least in part on the received service information.

6. The portable server diagnostic tool of claim 1, wherein the tool is configured to be attached to a server in the first plurality of servers.

7. A wireless diagnostic system for diagnosing a problem with at least one server comprising:
   a portable diagnostic tool including a wireless transmitter and a wireless receiver, the portable diagnostic tool configured to transmit requests with the tool's wireless transmitter;
   a wireless communication subsystem coupled to a first server, the wireless communication subsystem including a wireless transmitter and a wireless receiver, the wireless communication subsystem configured to receive a transmitted request from the portable diagnostic tool with the subsystem's wireless receiver, the wireless communication subsystem configured to transmit service information with the subsystem's wireless transmitter in response to a received request, the portable diagnostic tool configured to receive the service information with the tool's wireless receiver; and
   wherein the portable diagnostic tool includes a display screen, and wherein the portable diagnostic tool is configured to display information on the display screen based at least in part on the service information received from the first server, the displayed information including at least one image of a portion of the first server.

8. A wireless diagnostic system for diagnosing a problem with at least one server comprising:

a portable diagnostic tool including a wireless transmitter and a wireless receiver, the portable diagnostic tool configured to transmit requests to the server with the tool's wireless transmitter;

a wireless communication subsystem coupled to a first server, the wireless communication subsystem including a wireless transmitter and a wireless receiver, the wireless communication subsystem configured to receive a transmitted request from the portable diagnostic tool with the subsystem's wireless receiver, the wireless communication subsystem configured to transmit service information with the subsystem's wireless transmitter in response to a received request, the portable diagnostic tool configured to receive the service information with the tool's wireless receiver; and wherein the portable diagnostic tool is configured to play voice files, the voice files including repair description information for the server.

9. A wireless diagnostic system for diagnosing a problem with at least one server comprising:

a portable diagnostic tool including a wireless transmitter and a wireless receiver, the portable diagnostic tool configured to transmit requests with the tool's wireless transmitter;

a wireless communication subsystem implemented in or attached directly to a first server, the wireless communication subsystem including a wireless transmitter and a wireless receiver, the wireless communication subsystem configured to receive a transmitted request directly from the portable diagnostic tool with the subsystem's wireless receiver, the wireless communication subsystem configured to transmit service information with the subsystem's wireless transmitter in response to a received request, the portable diagnostic tool configured to receive the service information with the tool's wireless receiver; and wherein the portable diagnostic tool is configured to transmit a request for an identification response with the tool's wireless transmitter, the wireless communication subsystem configured to receive the transmitted request for an identification response from the portable diagnostic tool with the subsystem's wireless receiver, the first server configured to generate an identification response in response to receiving the request for an identification response.

10. The wireless diagnostic system of claim 9, wherein the identification response is an audible signal.

11. The wireless diagnostic system of claim 9, wherein the identification response is a visual indication.

12. A method of identifying a problem with at least one server comprising:

wirelessly transmitting a request with a portable diagnostic tool;

providing a wireless communication subsystem implemented in or attached directly to a first server;

receiving the transmitted request from the portable diagnostic tool with the wireless communication subsystem;

wirelessly transmitting service information with the wireless communication subsystem in response to a received request;

receiving the service information with the portable diagnostic tool;

providing a second wireless communication subsystem implemented in or attached directly to a second server;

receiving a transmitted request from the portable diagnostic tool with the second wireless communication subsystem;

wirelessly transmitting service information with the second wireless communication subsystem in response to a received request; and receiving the service information with the portable diagnostic tool.

* * * * *